(12) United States Patent
Galletti et al.

(10) Patent No.: US 11,045,674 B2
(45) Date of Patent: Jun. 29, 2021

(54) DRY ALARM VALVE ASSEMBLY FOR CONTROLLING A SPRINKLER FIREFIGHTING SYSTEM

(71) Applicant: BOCCIOLONE ANTINCENDIO S.P.A., Varallo (IT)

(72) Inventors: Stefano Galletti, Varallo (IT); Riccardo Vacca, Varallo (IT)

(73) Assignee: BOCCIOLONE ANTINCENDIO S.P.A., Varallo (IT)

( * ) Notice: Subject to any disclaimer, the term of this patent is extended or adjusted under 35 U.S.C. 154(b) by 107 days.

(21) Appl. No.: 15/696,887

(22) Filed: Sep. 6, 2017

(65) Prior Publication Data
US 2018/0064977 A1    Mar. 8, 2018

(30) Foreign Application Priority Data

Sep. 7, 2016  (IT) .......................... 102016000090459

(51) Int. Cl.
| | |
|---|---|
| *A62C 35/68* | (2006.01) |
| *F16K 27/12* | (2006.01) |
| *F16K 15/03* | (2006.01) |
| *F16K 17/04* | (2006.01) |
| *A62C 35/62* | (2006.01) |

(52) U.S. Cl.
CPC .............. *A62C 35/68* (2013.01); *A62C 35/62* (2013.01); *F16K 15/033* (2013.01); *F16K 17/04* (2013.01); *F16K 27/12* (2013.01)

(58) Field of Classification Search
CPC ....... A62C 35/68; A62C 35/62; F16K 15/033; F16K 17/04; F16K 27/12

USPC ........................................................... 169/20
See application file for complete search history.

(56) References Cited

U.S. PATENT DOCUMENTS

| | | | | |
|---|---|---|---|---|
| 2,352,996 | A | * | 7/1944 | Rider .................... A62C 35/605 169/17 |
| 3,456,989 | A | * | 7/1969 | Stevens .................... B60T 8/171 188/181 A |
| 3,589,445 | A | * | 6/1971 | Juliano .................. A62C 35/64 169/17 |
| 4,570,719 | A | | 2/1986 | Wilk |
| 5,236,049 | A | * | 8/1993 | Asselin .................. A62C 37/44 169/17 |

(Continued)

FOREIGN PATENT DOCUMENTS

| | | |
|---|---|---|
| DE | 43 20 442 | 12/1994 |
| DE | 10 2007 049588 | 4/2009 |
| WO | WO 99/59678 | 11/1999 |

*Primary Examiner* — Chee-Chong Lee
(74) *Attorney, Agent, or Firm* — Leason Ellis LLP

(57) ABSTRACT

A dry alarm valve assembly, for controlling a sprinkler firefighting system, has a first inlet connected to a pressurised air source, a second inlet connected to a pressurised water source, an outlet connected to a network of channels for supplying the sprinklers, and a valve that opens/closes a flow of water from the second inlet to the outlet; between the valve and the outlet there is a chamber communicating with the first inlet through a first pneumatic line, which includes a one-way valve; the assembly is provided with a blocking device to hold the valve closed and provided with a second pneumatic line, which is connected to an actuator of the blocking device so as to operate such actuator by means of pressurised air.

13 Claims, 4 Drawing Sheets

(56) References Cited

U.S. PATENT DOCUMENTS

| | | | | |
|---|---|---|---|---|
| 5,720,351 A | * | 2/1998 | Beukema | A62C 35/62 |
| | | | | 169/16 |
| 5,971,080 A | * | 10/1999 | Loh | A62C 35/66 |
| | | | | 169/17 |
| 5,992,532 A | * | 11/1999 | Ramsey | A62C 37/36 |
| | | | | 169/17 |
| 2007/0000671 A1 | | 1/2007 | Reilly et al. | |
| 2013/0098641 A1 | * | 4/2013 | Capsius | A62C 35/62 |
| | | | | 169/19 |

* cited by examiner

DRY ALARM VALVE ASSEMBLY FOR CONTROLLING A SPRINKLER FIREFIGHTING SYSTEM

PRIORITY CLAIM

This application claims priority from Italian Patent Application No. 102016000090459 filed on Sep. 7, 2016, the disclosure of which is incorporated by reference.

TECHNICAL FIELD

The invention relates to a dry alarm valve assembly for controlling a sprinkler firefighting system.

BACKGROUND OF THE INVENTION

Sprinkler firefighting systems are basically divided into two categories, namely wet systems, in which the network of channels supplying the sprinklers usually is full of pressurised water, and dry systems, in which the network of channels contains pressurised air, and water is supplied to the sprinklers only when one of the sprinklers is activated and, therefore, the pressure of the air drops suddenly.

In this second type of systems, an alarm valve assembly is provided, which comprises a shutter, which can rotate to open/close the valve. When the valve is closed, the shutter separates—in a fluid-tight manner—the pressurised water from a chamber that permanently communicates with the network of channels containing pressurised air. When the valve is open, the pressurised water reaches the sprinklers flowing through the chamber.

The alarm valve assembly has a blocking device having an actuator that is supplied by the pressurised water so as to hold the shutter in a closed position until the pressure of the air in the network of channels connected to the sprinklers drops. In particular, the alarm valve assembly is provided with a device to cause an immediate drop in the pressure of the water in the line that supplies the actuator in the presence of pressure drops of the air, thus enabling the rotation of the shutter. In this situation, the pressure of the water causes the immediate rotation of the shutter and, therefore, the sprinklers are promptly supplied.

The known solutions described above are largely used and are usually satisfactory, but they can be completely ineffective if they are installed and used in rooms where the temperature drops below 0° C.

In these cases, indeed, in the line supplying the actuator of the blocking device, water is subjected to a serious risk of freezing, also due to the relatively small diameter of the line; therefore, the actuator could be unable to operate. As a consequence, the shutter cannot rotate to open the valve and the aforesaid freezing prevents firefighting water from being supplied to the sprinklers.

SUMMARY OF THE INVENTION

The object of the invention is to provide a dry alarm valve assembly for controlling a sprinkler firefighting system, which solves the drawback discussed above in a simple and economic fashion and, preferably, offers a relatively simple solution in terms of building and installation and/or in case of a possible reset of the alarm valve assembly after a fire has been put out.

According to the invention, there is provided a dry alarm valve assembly for controlling a sprinkler firefighting system according to claim 1.

BRIEF DESCRIPTION OF THE DRAWINGS

The invention will now be described with reference to the accompanying drawings, which show a non-limiting embodiment thereof, wherein.

DETAILED DESCRIPTION OF THE INVENTION

Figure 1:
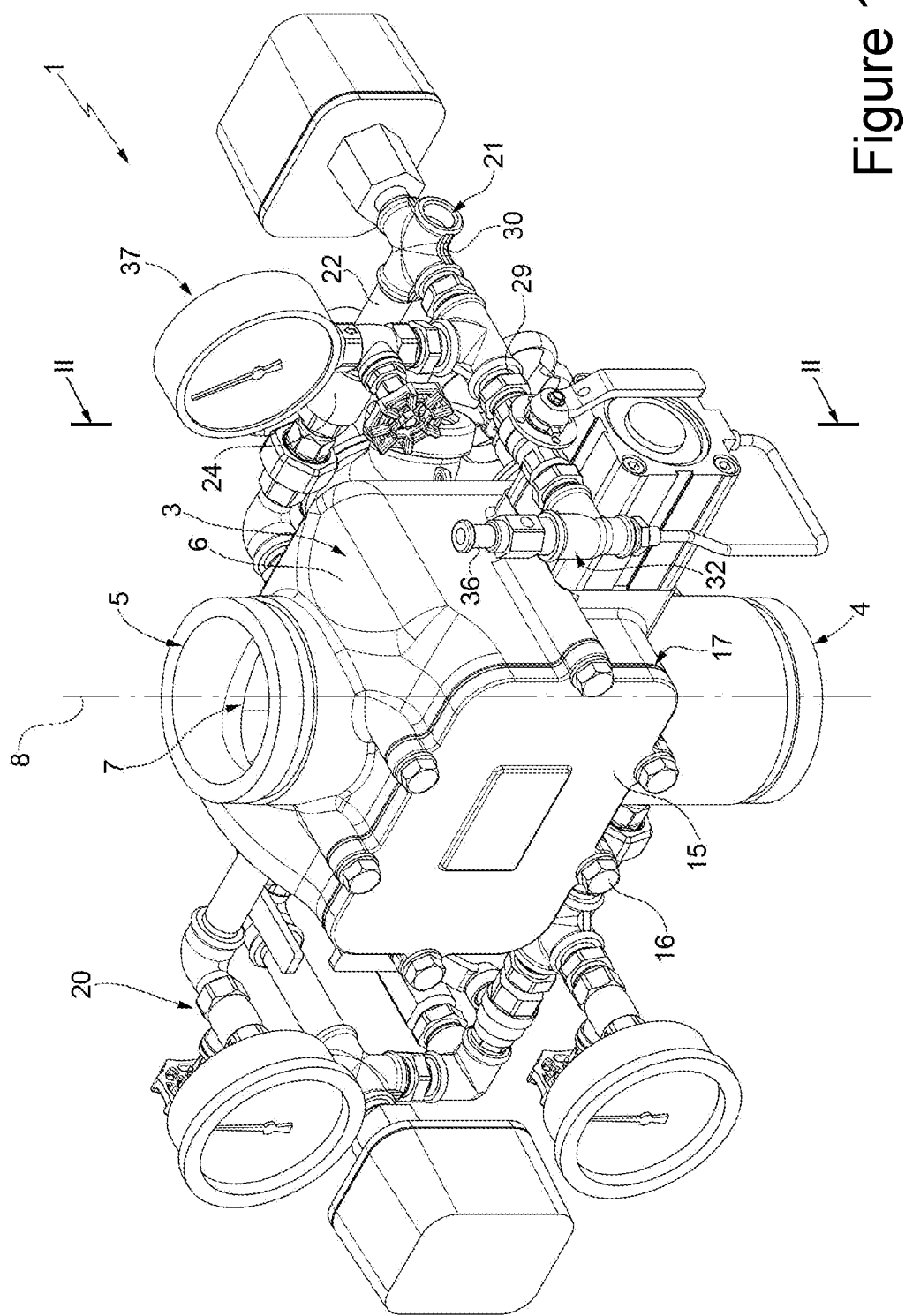
FIG. 1 is a perspective view from the top of a preferred embodiment of the dry alarm valve assembly for controlling a sprinkler firefighting system according to the invention.

In FIG. 1, reference number 1 indicates a dry alarm valve assembly for controlling a sprinkler firefighting system comprising a plurality of sprinklers (not shown), which are connected to a network of distribution channels (not shown).

The assembly 1 comprises a valve 3 having an inlet 4 and an outlet 5, which are configured so as to be connected—in a fluid-tight manner—to a pressurised water source (not shown) and to the network of distribution channels, respectively. In particular, the inlet 4 and the outlet 5 are defined by respective mouths of a valve body 6 having a duct 7, which extends along a preferably vertical axis 8.

Figure 2:
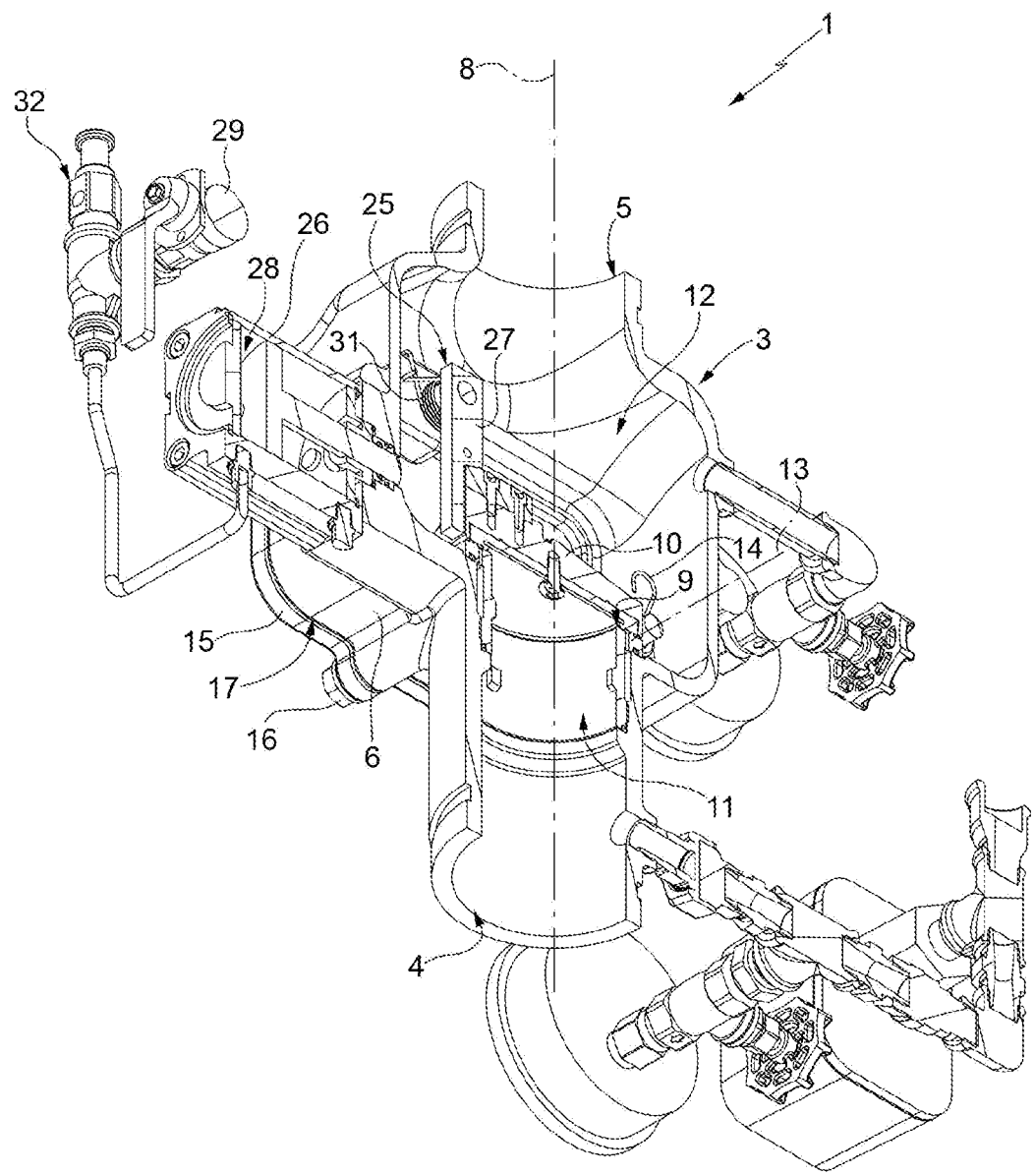
FIG. 2 shows the alarm valve assembly, in a perspective from the bottom and in a cross section along a vertical section plane identified by line II-II in FIG. 1.

With reference to FIG. 2, the valve 3 comprises a valve seat 9, which is arranged in the valve body 6 in a fixed position; and a shutter 10, which is movable with respect to the valve body 6 so as to open/close a flow of water through the valve seat 9. As a matter of fact, when the valve 3 is open, the inlet 4 communicates with the outlet 5 so as to supply water to the network of distribution channels through the duct 7. When the valve 3 is closed, on the other hand, the shutter 10 separates—in a fluid-tight manner—two regions 11, 12 of the duct 7; before a possible intervention of the firefighting system, the region 11 is full of pressurised water coming from the inlet 4, whereas the region 12 communicates with a pressurised air source, as explained more in detail hereinafter.

Preferably, the shutter 10 is defined by a rotary cap rotating inside the region 12 around a hinge axis 13, which is orthogonal to and spaced apart from the axis 8. This type of shutter is usually called "clapet".

The valve 3 comprises, furthermore, a positioning spring 14, which exerts a thrust upon the shutter 10 so as to automatically move it to a reference position corresponding to the position in which the valve 3 is closed.

Advantageously, the assembly 1 comprises a cover 15, which is fixed to the valve body 6, for example by means of screws 16, so as to close—in a fluid-tight manner—a front opening 17 of the region 12, and can be removed by an operator to inspect components inside the region 12.

Figure 3:
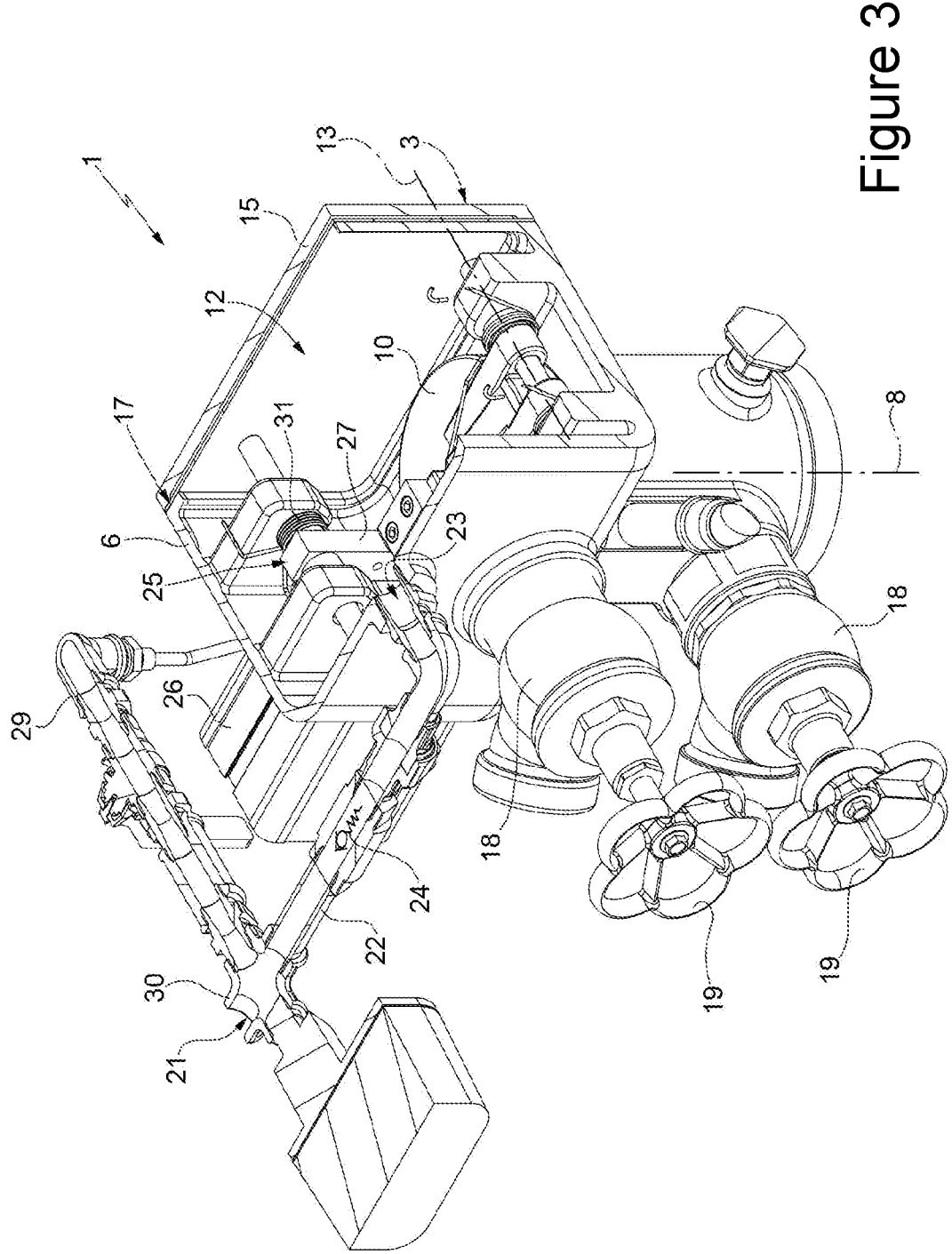
FIG. 3 shows the alarm valve assembly, in a perspective view and sectioned according to section planes that are different from the one of FIG. 2.

With reference to FIG. 3, the assembly 1 preferably comprises two draining ducts 18, which are independent of one another, communicate with the regions 11 and 12, respectively, and, in particular, are arranged on a side that is diametrically opposite to the opening 17. The ducts 18 are provided with respective taps 19, which are opened to drain water upstream and downstream, respectively, of the valve seat 9, for example after an intervention of the firefighting system.

As you can see in FIG. 1, the assembly 1 further comprises, advantageously, a plurality of hydraulic accessories or instruments 20, such as for example gauges, pressure switches, taps, alarm devices, etc., which are connected to the regions 11 and/or 12 in a way that is not described in detail, for the management of the water.

On the opposite side, as you can see in FIG. 3, the assembly 1 has an inlet 21 that, in use, is connected to the above-mentioned pressurised air source and communicates, through a pneumatic pipe or line 22, with a rear opening 23 of the region 12. The assembly 1 comprises a (schematically shown) one-way valve or check valve 24, which is arranged in the pipe 22 and has constructive features that are such as to allow air to flow from the inlet 21 towards the region 12 (when the valve 3 is closed) and to prevent water from flowing towards the inlet 21 (when the valve 3 is open).

When the valve 3 is closed, the pressure of the water in the region 11 generates a thrust that is sufficient to move the shutter 10 and, therefore, open the valve 3. In order to counter the pressure of the water, the assembly 1 comprises a blocking device 25, which holds the shutter 10 coupled against the valve seat 9 and comprises, in turn, an actuator 26 and a retaining element (retaining lever) 27, which is movable—due to the action of the shutter 26—between a release position and a blocking position. In the blocking position, the element 27 interacts with the shutter 10 so as to keep it steadily closed. In the release position, on the other hand, the shutter 10 is free to move so as to open the valve 3 due to the thrust of the water in the region 11.

According to the invention, as you can see in FIG. 2, the actuator 26 is a pneumatically operated actuator. In particular, the actuator 26 has at least one chamber 28, which receives a supply of pressurised air through a pneumatic line or pipe 29.

As you can see in FIG. 2, the pipe 29 preferably receives the pressurised air from the inlet 21, and not from another dedicated inlet. In particular, the pipe 29 is connected to the pipe 22 by means of a joining fitting 30, which is arranged upstream of the valve 24.

The pressure of the air in the chamber 28 causes the movement of the element 27 from the release position to the blocking position. Preferably, the actuator 26 is defined by a single-acting cylinder and, therefore, the device 25 comprises at least one spring 31, which exerts a thrust that is opposite to the one of the pressure in the chamber 28, so as to move the element 27 to the release position when the pressure drops below a threshold value.

Figure 4:
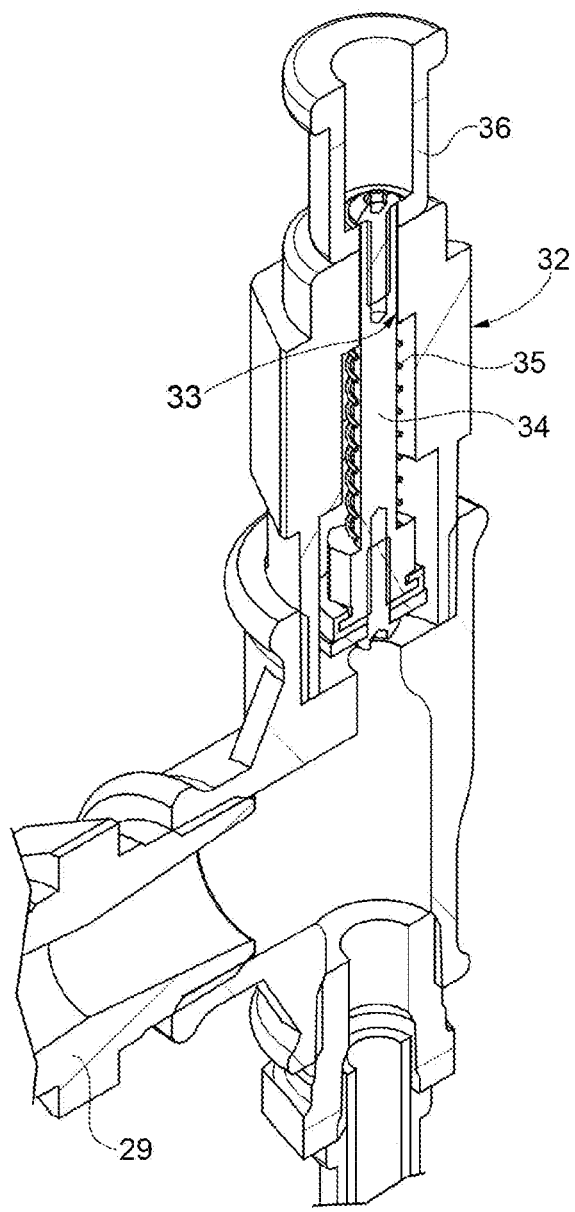
FIG. 4 is a perspective of a detail of the alarm valve assembly, shown on a larger scale and in a cross section.

According to a preferred aspect of the invention, the assembly 1 comprises, furthermore, a relief valve 32, which communicates with the pipe 29 and is preferably fitted on the pipe 29 itself close to the actuator 26. As you can see in FIG. 4, the valve 32 has a discharge channel 33 directly leading into the atmosphere and comprises a shutter 34, which is movable between an advanced position and a withdrawn position due to the opposite thrusts exerted by the pressure in the pipe 29, in one direction, and by a spring 35 and/or by the weight of the shutter 34, in the opposite direction. In the withdrawn position, the pipe 29 communicates with the channel 33 through a passageway; in the advanced position (not shown), the passageway is closed by the shutter 34. The latter automatically withdraws when the pressure of the air in the pipe 29 drops below a threshold vale (defined by the pre-load of the spring 35 and/or by the weight of the shutter 34).

The shift to the withdrawn position takes place when at least one of the sprinklers is activated and, hence, the pressure in the network of distribution channels, in the region 12 and in the pipes 22 and 29 starts dropping with respect to a situation in which the sprinklers are all closed. In particular, the valve 32 is calibrated so as to be sensitive to relatively small pressure drops.

The withdrawing of the shutter 34 causes the relief of air into the atmosphere and, therefore, a further and sudden pressure drop in the pipe 29. This pressure drop, in turn, causes the instantaneous deactivation of the device 25 (namely, the instantaneous movement of the element 27 to the release position) and, hence, the pressure of the water in the region 11 automatically opens the shutter 10 so as to supply the sprinklers that were activated.

The shutter 34 requires a manual remote control or a direct manual action to be shifted into the advanced position in the absence of pressure in the pipe 29, during the first installation of the assembly 1 and during the necessary reset operations carried out on the assembly 1 after an intervention of the firefighting system.

In particular, an end 36 of the shutter 34 projects out of channel 33 and, therefore, it can be grabbed and pulled by the operator into the advanced position. This manual displacement is carried out only after having temporarily interrupted the supply of water to the inlet 4 (in these conditions, the shutter 10 surely closes the valve 3 due to the spring 14 and/or its own weight). Since the elimination of the relief from the channel 33 restores the air pressure in the pipe 29 and in the chamber 28, the element 27 moves to the blocking position and, hence, stops the shutter 10 in its closing position. At this point, the supply of water to the inlet 4 can be resumed.

Advantageously, as you can see in FIG. 1, the assembly 1 comprises a plurality of pneumatic accessories or instruments 37, such as for example gauges, pressure switches, taps, alarm devices, etc., which are connected to the pipe 29 and/or to the pipe 22 in a way that is not described in detail, for the management of the pressurised air. Preferably, the instruments 37 and the actuator 26 are arranged on one side of the assembly (right or left side, frontally watching the cover 15), whereas the instruments 20 are arranged on the opposite side, so as to display them more easily and make maintenance simpler.

Owing to the above, the actuator 26 is supplied by a pipe (namely, the pipe 29) that does not transport water, but pressurised air, and—therefore—it is not affected by clogging risks due to the freezing of the operating fluid. Hence, the assembly 1 can be installed without drawbacks also in environments where the room temperature reaches values below zero.

Moreover, the presence of the valve 32 allows the device 25 to be released in a quick manner as soon as the pressure in the pipes 22, 29 tends to drop because of the activation of one or more sprinklers. The relative proximity between the chamber 28 and the valve 32 makes the release of the device 25 even more immediate.

The first installation of the assembly 1 and a possible reset thereof after an intervention of the firefighting system are relatively simple to be carried out, as they basically require only two operations, namely the movement of the shutter 34 to the advanced position, so as to activate the device 25, and the following opening of the water supply.

At the same time, the assembly 1 is relatively simple from a constructive point of view. In particular, the parts engaged by air (the pipes 22 and 29, the instruments 37, the actuator 26) are separate from the parts engaged by water (the instruments 20), and the assembly 1 does not comprise any specific device to interface water and air when the valve 3 is closed, except for the shutter 10. The assembly is also simple in terms of maintenance and inspection, thanks to the presence of the cover 15 and/or to the special arrangement of the instruments 20, 37 on the opposite sides of the valve body 6.

Owing to the above, finally, the assembly 1 described and shown herein can evidently be subject to changes and variations that do not go beyond the scope of protection of the invention, as set forth in the appended claims.

In particular, the valve 32 could be absent or have a different configuration from the one described by mere way of preferred example; and the constructive features of the shutter 10 and/or of the device 25 could be different from the ones discussed above.

What is claimed is:

1. Dry alarm valve assembly for controlling a sprinkler firefighting system, the assembly comprising:
    a first inlet suitable to be connected to a pressurised air source;
    a second inlet suitable to be connected to a pressurised water source;
    an outlet suitable to be connected to a network of channels for supplying the sprinklers;
    a valve that opens/closes to control a flow of water from the second inlet to the outlet;
    a blocking device comprising:
        a) a retaining lever moveable between a release position, in which the valve is free to open due to the retaining lever being uncoupled from the valve, and a blocking position, in which the retaining lever holds the valve closed, wherein the retaining lever is biased by a spring that applies a force to the retaining lever in a direction that causes the retaining lever to move to the release position, and
        b) an actuator that can be operated to move and hold said retaining lever into the blocking position;
    a region arranged between said valve and said outlet and communicating with said first inlet through a first pneumatic line;
    a one-way valve arranged in said first pneumatic line;
    wherein the assembly comprises a second pneumatic line suitable to be connected to the pressurized air source; the second pneumatic line being in direct pneumatic communication with at least one chamber of said actuator to operate said actuator by means of pressurized air causing the retaining lever to be moved and hold into the blocking position;
        wherein said at least one chamber has only a single opening, and said second pneumatic line directly and pneumatically communicates with said at least one chamber through said single opening.

2. The assembly according to claim 1, wherein the assembly comprises a relief valve communicating with said second pneumatic line and comprising:
    a discharge leading into the atmosphere;
    a shutter movable between a withdrawn position, in which said second pneumatic line communicates with said discharge through a passageway, and an advanced position, in which said passageway is closed.

3. The assembly according to claim 2, wherein said shutter is configured so as to move automatically into the withdrawn position when the pressure of the air in said second pneumatic line drops below a threshold value.

4. The assembly according to claim 2, wherein said shutter is configured so as to require a direct manual action or a manual remote control to be shifted into the advanced position.

5. The assembly according to claim 4, wherein said shutter projects externally with respect to said discharge.

6. The assembly according to claim 2, wherein said relief valve is mounted on said second pneumatic line.

7. The assembly according to claim 1, wherein said valve comprises a valve body; the assembly comprising a plurality of hydraulic instruments and a plurality of pneumatic instruments, respectively arranged on opposite sides of said valve body.

8. The assembly according to claim 1, wherein said valve comprises a valve body having a front opening closed in a fluid-tight manner by a cover, fixed to said valve body and removable from said valve body.

9. The assembly according to claim 1, wherein said second pneumatic line is isolated from said region when said valve is open.

10. The assembly according to claim 9, wherein said second pneumatic line pneumatically communicates with said first inlet; said one-way valve being arranged to prevent water from flowing from said region towards said first inlet when said valve is open.

11. The assembly according to claim 1, wherein the assembly comprises a shutter movable between an open and a closed position so as to respectively open and close said valve; in the blocking position, said retaining lever stopping the shutter in the closed position.

12. The assembly according to claim 1, wherein the spring directly applies the force to the retaining lever due to the spring being in direct contact with the retaining lever.

13. Dry alarm valve assembly for controlling a sprinkler firefighting system, the assembly comprising:
    a first inlet suitable to be connected to a pressurised air source;
    a second inlet suitable to be connected to a pressurised water source;
    an outlet suitable to be connected to a network of channels for supplying the sprinklers;
    a valve that opens/closes to control a flow of water from the second inlet to the outlet;
    a blocking device comprising:
        a) a retaining lever moveable between a release position, in which the valve is free to open due to the retaining lever being uncoupled from the valve, and a blocking position, in which the retaining lever holds the valve closed, wherein the retaining lever is biased by a spring that applies a force to the retaining lever in a direction that causes the retaining lever to move to the release position, and
        b) an actuator that can be operated to move and hold said retaining lever into the blocking position;
    a region arranged between said valve and said outlet and communicating with said first inlet through a first pneumatic line;
    a one-way valve arranged in said first pneumatic line;
        wherein the assembly comprises a second pneumatic line suitable to be connected to the pressurized air source; the second pneumatic line being in direct pneumatic communication with at least one chamber of said actuator to operate said actuator by means of pressurized air causing the retaining lever to be moved and hold into the blocking position;
        wherein said actuator is defined by a single-acting pneumatic cylinder.

* * * * *